United States Patent [19]

Mannherz et al.

[11] Patent Number: 4,704,907
[45] Date of Patent: Nov. 10, 1987

[54] ELECTROMAGNETIC FLOWMETER WITH TRIANGULAR FLUX DRIVE

[75] Inventors: Elmer D. Mannherz, Southampton; Roy F. Schmoock, Yardley; Herbert A. Shauger, Doylestown, all of Pa.

[73] Assignee: Fischer & Porter Company, Warminster, Pa.

[21] Appl. No.: 884,510

[22] Filed: Jul. 11, 1986

[51] Int. Cl.⁴ .............................................. G01F 1/60
[52] U.S. Cl. .................................................. 73/861.17
[58] Field of Search ........... 73/861.12, 861.16, 861.17, 73/861.14

[56] References Cited

U.S. PATENT DOCUMENTS

| | | | |
|---|---|---|---|
| 3,802,263 | 4/1974 | Krechmery et al. | 73/861.16 |
| 3,965,738 | 6/1976 | Watanabe | 73/861.17 |
| 4,157,035 | 6/1979 | Doll et al. | 73/861.17 |
| 4,227,408 | 10/1980 | Schmoock et al. | 73/861.17 |
| 4,513,624 | 4/1985 | McHale et al. | 73/861.12 |

Primary Examiner—Charles A. Ruehl
Attorney, Agent, or Firm—Michael Ebert

[57] ABSTRACT

An electromagnetic flowmeter in which the fluid being metered passes through a flow tube to intersect the lines of flux of a magnetic field produced by an electromagnet whereby the resultant voltage induced in the fluid is transferred to a pair of electrodes mounted at diametrically-opposed positions on the tube. The electromagnet is so driven as to produce a flux field having a triangular wave form. The voltage signal yielded by the electrodes is therefore a composite having a triangular wave component that is a replica of the flux wave and a rectangular wave component that is generated by a spurious loop pick up voltage. The composite signal is applied to a converter and processed therein to cancel out the rectangular wave component whereby the converter output signal is accurately proportional to the flow rate of the fluid.

8 Claims, 5 Drawing Figures

ELECTROMAGNETIC FLOWMETER WITH TRIANGULAR FLUX DRIVE

BACKGROUND OF INVENTION

1. Field of Invention

This invention relates generally to electromagnetic flowmeters in which a pair of electrodes is mounted at diametrically-opposed positions on a flow tube through which passes the fluid being metered to intersect the lines of magnetic flux produced by an electromagnet, and in particular to a meter of this type in which the electromagnet is so driven as to produce a flux field having a triangular wave form, the resultant electrode flow rate signal being a composite wave that includes a spurious voltage component which is rejected in the converter coupled to the electrodes to yield an output signal that is accurately proportional to the flow rate of the fluid.

2. Status of Prior Art

In an electromagnetic flowmeter, the liquid whose flow rate is to be measured is conducted through a flow tube provided with a pair of diametrically-opposed electrodes, a magnetic field perpendicular to the longitudinal axis of the tube being established by an electromagnet. When the flowing liquid intersects this field, a voltage is induced therein which is transferred to the electrodes to provide an electrode signal. This signal, which is proportional to the average velocity of the liquid and hence to its average volumetric rate, is then amplified and processed in a converter to actuate a recorder or indicator.

The magnetic field may be either direct or alternating in nature, for in either event the amplitude of voltage induced in the liquid passing through the field will be a function of its flow rate. However, when operating with direct magnetic flux, the D-C signal current flowing through the liquid acts to polarize the electrodes, the magnitude of polarization being proportional to the time integral of the polarization current. With alternating magnetic flux operation, polarization is rendered negligible, for the resultant signal current is alternating and therefore its integral does not build up with time.

Though A-C operation as disclosed, for example, in the Cushing U.S. Pat. No. 3,693,439 is clearly advantageous in that polarization is obviated and the A-C flow induced signal may be more easily amplified, it has distinct drawbacks. The use of an alternating flux introduces spurious voltages that are unrelated to flow rate and, if untreated, give rise to inaccurate indications. The two spurious voltages that normally are most troublesome are:

1. stray capacitance-coupled voltages from the coil of the electromagnet to the electrodes, and
2. induced loop voltages in the input leads. The electrodes and leads in combination with the liquid extending therebetween constitute a loop in which is induced a voltage from the changing flux of the magnetic coil.

The spurious voltages from the first source may be minimized by electrostatic shielding and by low-frequency excitation of the magnet to cause the impedance of the stray coupling capacitance to be large. But the spurious voltage from the second source is much more difficult to suppress.

The spurious voltage resulting from the flux coupling into the signal leads is usually referred to as the quadrature voltage, for it is assumed to be 90° out of phase with the A-C flow-induced voltage. Actual tests have indicated that this is not true in that a component exists in-phase with the flow-induced voltage. Hence, that portion of the "quadrature voltage" that is in-phase with the flow-induced voltage signal constitutes an undesirable signal that cannot readily be distinguished from the flow-induced signal, thereby producing a changing zero shift effect.

All of the adverse effects encountered in A-C operation of electromagnetic flowmeters can be attributed to the rate of change of the flux field ($d\phi/dt$), serving to induce unwanted signals in the pick-up loop. If, therefore, the rate of change in the flux field could be reduced to zero value, then the magnitude of quadrature and of its in-phase component would become non-existent and zero drift effects would disappear.

When the magnetic flux field is a steady state field, as, for example, with continuous d-c operation, the ideal condition $d\phi/dt=0$ is satisfied. But, as previously noted, d-c operation to create a steady state field is not acceptable, for galvanic potentials are produced and polarization is encountered.

In the patent to Mannherz et al., U.S. Pat. No. 3,783,687, there is disclosed an electromagnetic flowmeter in which the excitation current for the electromagnetic coil is a low-frequency wave serving to produce a periodically-reversed steady state flux field, whereby unwanted in-phase and quadrature components are minimized without giving rise to polarization and galvanic effects. This low frequency wave is derived by means of a presettable scaler coupled to the standard a-c power line (60 Hz) and is at a frequency in the order of $1\frac{7}{8}$, $3\frac{3}{4}$, $7\frac{1}{2}$ or 15 Hz. A similar flowmeter arrangement having a low-frequency square wave drive is disclosed in the Schmoock U.S. Pat. No. 4,370,892.

When the fluid being metered takes the form of a coarse slurry containing solid particles such as sand, fly ash or salt which impinge on the surface of the electrodes as the slurry passes through the meter tube, it has been found that a substantial noise component is generated. This makes signal detection more difficult, and in some instances impossible. The meter electrodes in combination with the fluid acting as an electrolyte define a galvanic cell, and when the solids in the slurry strike the electrodes and alter their interface to the fluid, this action brings about a rapid change in galvanic voltage, thereby generating low frequency noise.

Noise is any voltage that does not convey measurement information. Under the most favorable circumstances where noise has been minimized by filtering or other expedients, there are still certain sources of noise present resulting from the granular nature of matter and energy. While noise fluctuations may be small compared with the total energy transfer involved in most measurements, the existence of a noise background limits the ultimate sensitivity to which a measurement can be carried.

When measuring the flow of slurries, the solid particles therein impinge on the surface of the electrodes in contact with the fluid. The electronic noise resulting from such impingement creates a major problem when the flowmeter is of the type whose electromagnet is driven by a low-frequency square wave; i.e., a frequency which is less than 30 Hz. It has been found that the level of such noise is inversely related to the drive frequency and is therefore relatively high when using a low-frequency drive. Hence by raising the square wave drive frequency, one can reduce the response of the electrode signal converter to noise by the same proportion.

Thus, while an electromagnetic flowmeter operating with a 7.5 Hz square wave drive frequency is subject to a high level of noise when metering slurries, a meter of this type operating at 30 or 60 Hz will almost be free of this noise problem. However, when one increases the frequency of the square wave flux, drive problems begin to develop, for the switching impulse coupled into the electrode circuit and carrying over into the measuring period seriously impairs the accuracy and zero stability of the system. This effect is aggravated by the fact that a larger "zap" voltage is required to overcome the L/R time of the electromagnet coils.

Moreover, at the higher square wave drive frequency, the phase shift or time delay imparted to the flow signal starts to become significant when using the magnet current for a reference voltage, and this gives rise to measurement errors in the converter coupled to meter electrodes.

Inasmuch as the present invention makes use of a triangular wave magnetic flux field, the patent to McHale et al., U.S. Pat. No. 4,513,624, which also uses a triangular magnetic wave in an electromagnetic flowmeter, is pertinent. However, in the McHale et al. patent, the flowmeter makes use of electrodes that are capacitively coupled to the fluid, not in direct contact therewith as in one embodiment of the present invention. Hence, the current signal yielded by the electrodes in this prior patent is not comparable to the voltage signal produced by a meter in accordance with the invention and does not yield similar beneficial results. Moreover, the prior patent does not discriminate between a triangular wave and a rectangular wave component in the signal yielded by the electrodes in the manner of the present invention.

SUMMARY OF INVENTION

In view of the foregoing, the main object of this invention is to provide an electromagnetic flowmeter capable of accurately measuring the flow rate of fluids passing therethrough despite the fact that the signal yielded by the electrodes includes a spurious voltage component.

More particularly, an object of this invention is to provide a magnetic flowmeter whose magnetic flux field has a triangular wave form, and the spurious voltage component then assumes a rectangular wave form, thereby making it possible in the converter associated with the meter electrodes to cancel out the spurious component.

Also an object of this invention is to provide a meter of the above type in which the triangular magnetic field flux wave has a frequency that is at least 30 Hz, whereby the meter is relatively insensitive to noise produced by solid particles in the slurry impinging on the electrodes.

Still another object of this invention is to provide an electromagnetic flowmeter that is reliable and efficient in operation.

Briefly stated, these objects are accomplished in an electromagnetic flowmeter in which the fluid being metered passes through a flow tube to intersect the lines of flux of a magnetic field produced by an electromagnet, whereby the resultant voltage induced in the fluid is transferred to a pair of electrodes mounted at diametrically-opposed positions on the tube.

The electromagnet is so driven as to produce a flux field having a triangular wave form. The voltage signal yielded by the electrodes is therefore a composite having a triangular wave component that is a replica of the flux wave and a rectangular wave component that is generated by a spurious loop pick-up voltage. The composite signal is applied to a converter and processed therein to reject the rectangular wave component whereby the converter output signal is accurately proportional to the flow rate of the fluid.

OUTLINE OF DRAWINGS

For a better understanding of the invention as well as other objects and further features thereof, reference is made to the following detailed description to be read in conjunction with the accompanying drawings, wherein:

FIG. 5 is a timing diagram whose waveforms A to C are related to the operation of a third embodiment of the invention.

DESCRIPTION OF INVENTION

First Embodiment

Figure 1:
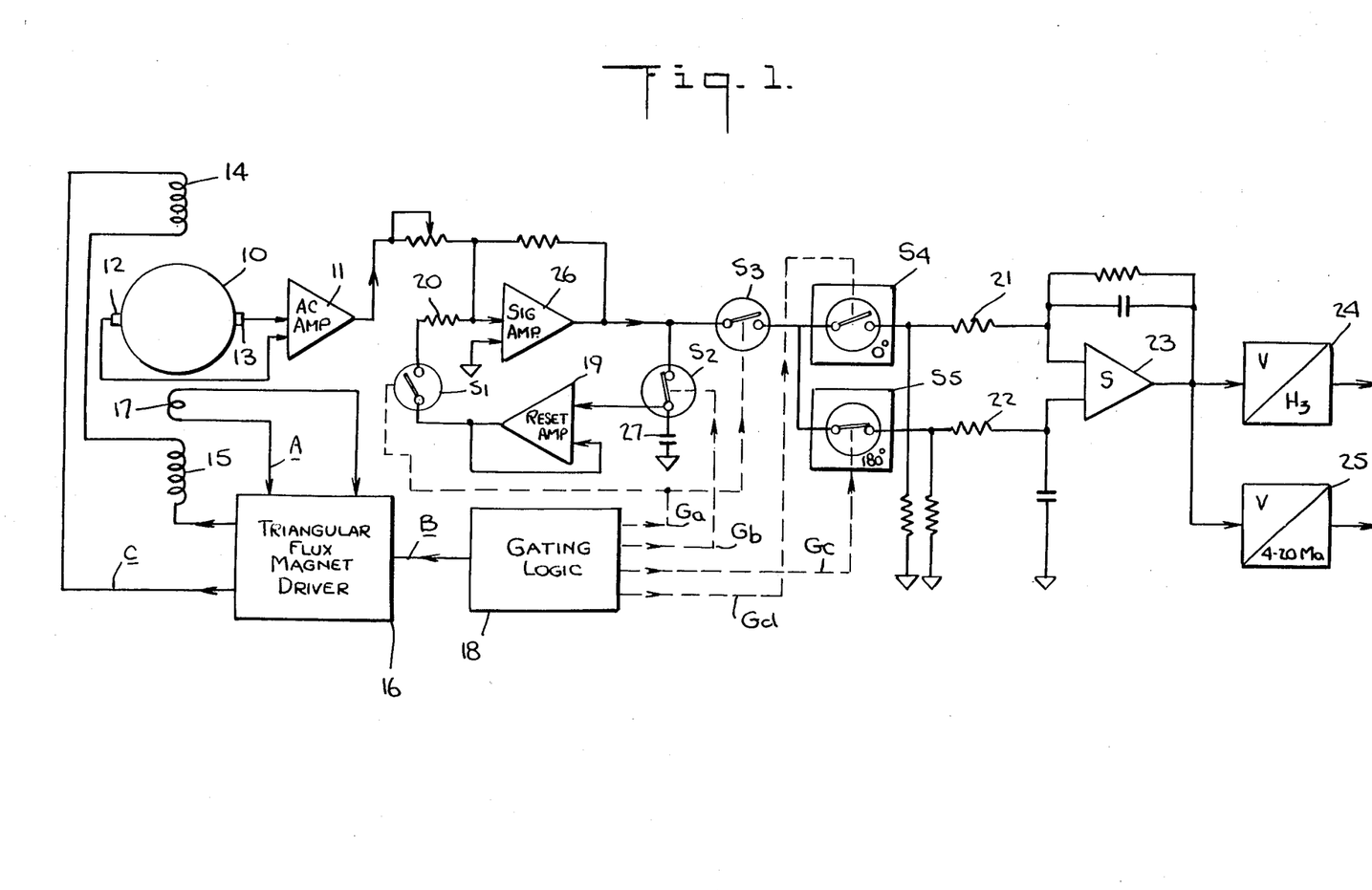
FIG. 1 is a schematic diagram of a preferred first embodiment of a flowmeter in accordance with the invention.

Referring now to FIG. 1, there is shown an electromagnetic flowmeter system in accordance with the invention. The system is constituted by a flowmeter primary including a flow tube 10 through which the fluid to be metered is conducted to produce a voltage signal whose amplitude is a function of flow rate. This signal is applied to the A-C input amplifier 11 of a secondary or converter, input amplifier 11 preferably having a high input impedance.

Electrodes 12 and 13 are mounted at diametrically-opposed positions on flow tube 10 in direct physical and electrical contact with the fluid. A magnetic field whose lines of flux are transverse to the longitudinal direction of flow is established by an electromagnet including a pair of coils 14 and 15 mounted on opposing sides of the flow tube on an axis normal to the electrode axis. The electrode axis is perpendicular both to the longitudinal direction of flow through the flow tube and to the transverse magnetic field produced by the electromagnet.

As is well known, a voltage is induced in the fluid where its flow intersects the lines of flux of the magnetic field. This voltage is transferred to electrodes 12 and 13 to produce a flow-induced signal reflecting the flow rate.

The coils 14 and 15 of the electromagnet are so driven by a magnetic flux driver 16 as to produce a flux field having a triangular waveform. In practice, this frequency may be at least 30 Hz. The magnet driver 16 receives a square wave from a flux sensing pick up coil 17 in the primary and a square wave set point from a gating logic 18 in the secondary of the system. The waveform of the square wave from the sensing coil 17 is illustrated by form A in the timing diagram in FIG. 2, and that from the gating logic by form B.

The spurious electrode loop pick-up voltage (quadrature) is a function of the derivative of the flux in respect to time; that is, $d\phi/dt$. For a flux ramp with a constant slope which is the case with a triangular wave flux field, the derivative $d\phi/dt$ becomes equal to a constant. Hence $d\phi/dt=k$. It will be seen in form A of FIG. 2 representing the pick-up loop voltage that this wave is negative during one half cycle of each period, and positive during the remaining half cycle.

Figure 2:
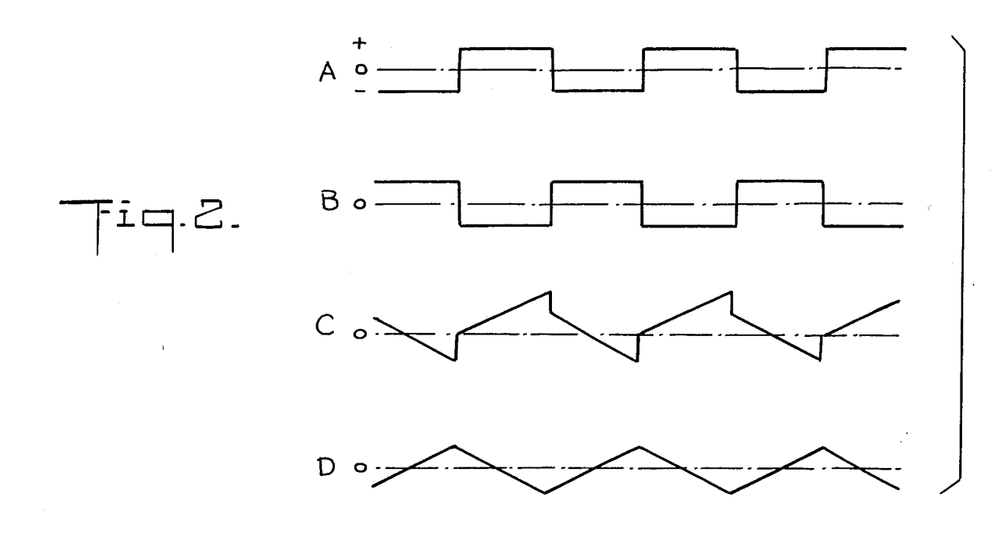
FIG. 2 is a timing diagram whose waveforms A to D are related to the operation of the flowmeter shown in FIG. 1.

The voltage from the flux sensing coil 17 will be a perfect square wave only if the magnetic flux field wave within the meter is a perfectly linear ramp in either direction, this triangular wave being represented by form D in FIG. 2. Therefore, if the set point as represented by form B is a square wave, the control loop within electromagnet driver 16 will provide a voltage drive to the magnet, as shown in form C, of such nature as to maintain a nearly perfect triangular flux wave indicated by form D within the metering system. The voltages represented by waveforms A to C appear in FIG. 1 in the places indicated by these letters. The reason that the output of driver 16 is not a perfect triangular voltage but has a step therein between the sloped portions of the wave, as shown in Form C in FIG. 2, is to take into account the complex impedance represented by the inductance and resistance of electromagnet coils 14 and 15 connected to the output of driver 16. The step in the composite waveform shown in form C in FIG. 2 is a function of this impedance.

Figure 3:
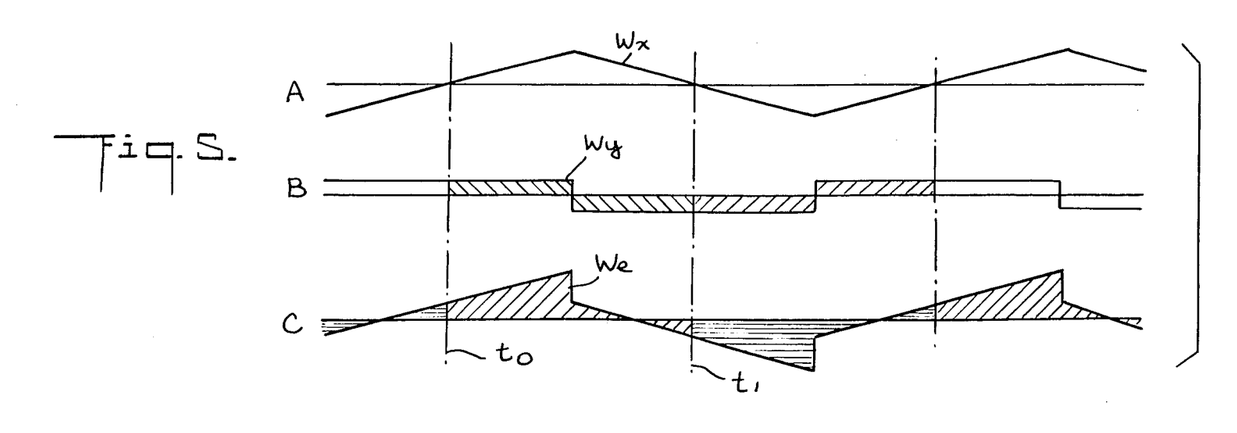
FIG. 3 is a timing diagram whose waveforms I and VII are related to the operation of the secondary of the flowmeter.

As shown in form I of the timing diagram in FIG. 3, in the absence of flow, the signal yielded by the electrodes of the flowmeter is a square wave $W_r$ which reflects the pick-up loop voltage. When, however, fluid flows through the meter to intersect the magnetic flux produced by the triangular flux wave, the resultant electrode signal $W_c$ as shown in form II in FIG. 3, is a composite, one component being the triangular wave flow signal and the other the rectangular wave pick-up loop voltage.

As pointed out previously, with a relatively high drive frequency—that is, one which has at least 30 Hz—the noise resulting from the impingement of slurry particles on the electrodes is minimized. And with a triangular magnetic field flux wave, the resultant quadrature voltage derivative is equal to a constant. Hence, in order to obtain an output signal in which the quadrature component is eliminated, it is now necessary to so process the composite signal $W_c$ yielded by the electrodes as to exclude the quadrature component $W_r$ and thereby provide an output which is accurately proportional to flow rate. It is important to note that while advantages in regard to noise are gained by operating the meter with a relatively high frequency, the invention is by no means limited to such operation; for, as will now be explained, with a triangular wave flux field it becomes possible to separate the spurious pick-up component from the electrode signal.

In order to eliminate the $d\phi/dt$ pick-up voltage component, the arrangement of the flowmeter secondary is such as to set the electronics to zero after each flux transition. To this end, as shown in FIG. 1, the output of the a-c input amplifier 11 is applied to the input of a signal amplifier 26. Associated with signal amplifier 26 is a reset amplifier 19, the output of signal amplifier 26 being connected to the input of reset amplifier 19 through an electronic switch $S_2$. The output of reset amplifier 19 is connected through an electronic switch $S_1$ in series with a resistor 20 to the input of signal amplifier 26, such that when switch $S_2$ is opened and switch $S_1$ is closed, amplifier 26 is reset to zero.

The output of signal amplifier 26 is applied through an electronic switch $S_3$ to a pair of synchronous demodulators represented by electronic gates $S_4$ and $S_5$ which are gated to operate in phase opposition, so that demodulator gate $S_4$ acts as a 0° sync demodulator, and demodulator gate $S_5$ as the 180° sync demodulator. The d-c outputs yielded by demodulators $S_4$ and $S_5$ are applied through resistors 21 and 22 to a d-c integrating amplifier 23 to produce a direct voltage signal whose magnitude is a function of the flow rate. A more detailed description of these synchronous demodulators is found in the Schmoock et al. U.S. Pat. No. 4,227,408. The analog voltage output of the signal processor is applied to a voltage-to-frequency converter 24 and also to a voltage-to-current converter 25 to provide a frequency output and a current output that is proportional to the flow rate of the fluid being metered. The synchronous demodulators do not represent a novel aspect of the present invention, and in practice an analog-to-digital converter controlled by a microprocessor can be used which does not use a synchronous demodulator and acts to process the signal digitally.

The actuation of the electronic switches and the gating of the synchronous demodulators are effected in proper time sequence by logic 18 so that during each cycle of the drive, the logic sends out the appropriate control pulses.

Electronic switches $S_1$ and $S_3$ are simultaneously actuated by gating pulses $G_a$ derived from logic 18, gating pulses $G_a$ being shown in line IV of FIG. 3. Gating pulses $G_b$, as shown in line V of FIG. 3, are applied to actuate electronic switch $S_2$ to rezero the system during each half cycle.

In the embodiment of the invention shown in FIGS. 1 to 3, the composite signal wave represented in line II of FIG. 3 yielded by the meter electrodes in the primary is forced in the secondary of the system to zero immediately following flux reversal. As a consequence, the pick-up spurious voltage, as long as it remains constant during the half cycles is cancelled out, and the triangular wave which remains is purely a function of flow rate and is independent of the spurious voltage component.

This cancellation is carried out by the circuit shown in FIG. 1 in the following manner:

Immediately following flux reversal, a gating pulse $G_b$ (see FIG. 3 - line V) causes switch $S_2$ to close, while a gating pulse $G_a$ (see FIG. 3 - line IV) causes switches $S_1$ and $S_3$ to simultaneously open. As a result of this action, the output voltage from signal amplifier 26 then is applied through closed switch $S_2$ to a storage capacitor 27 and charges this capacitor.

The voltage then stored in capacitor 27 is the same as that of the composite signal wave $W_c$ (FIG. 3 - line II). Upon the conclusion of gating pulse $G_b$, switch $S_2$ is reopened. The conclusion of gating pulse $G_a$ closes switches $S_1$ and $S_3$, the voltage stored in capacitor 27 is applied through reset amplifier 19, closed switch $S_1$ and resistor 20 to the input of signal amplifier 26 to which is also fed the composite wave from the output of a-c amplifier 11 connected to the electrodes. The output of signal amplifier 26, which is fed to the synchronous demodulator via then closed switch $S_3$, represents the difference between the composite signal and the voltage stored in capacitor 27; hence, the output signal from switch S₃ is one from which the spurious component has been separated and eliminated.

In the case of a 30 Hz drive frequency, gating pulses $G_b$ permit sampling of the flow signal necessary to zero set signal amplifier 26 after each flux transition (reversal of direction). As a consequence, the output signal from switch S₃ takes the form shown on line III of FIG. 3, where it will be seen that the signal is composed of right angle triangular pulses $P_t$ of alternating polarity. The gap between successive triangular pulses $P_t$ is equal to the blanking gate pulse $G_a$ duration $t_0$ to $t_2$, the duration $t_0$ to $t_1$ being that of gate pulse $G_b$.

The rectangular gating pulses $G_c$ applied to 180° demodulator S₅ are shown in line VI of FIG. 3, the duration of these pulses being equal to a half cycle of the flow signal. The rectangular gating pulses $G_d$ applied to the 0° demodulator S₄ which are out of phase with gating pulses $G_c$ are shown in line VII of FIG. 3. Thus the negative triangular pulses $P_t-$ in the wave shown in line III of FIG. 3 are demodulated by one of the demodulators and the positive triangular pulses $P_t+$ in the output of amplifier 11 are demodulated by the other demodulator.

Other Embodiments

Figure 4:
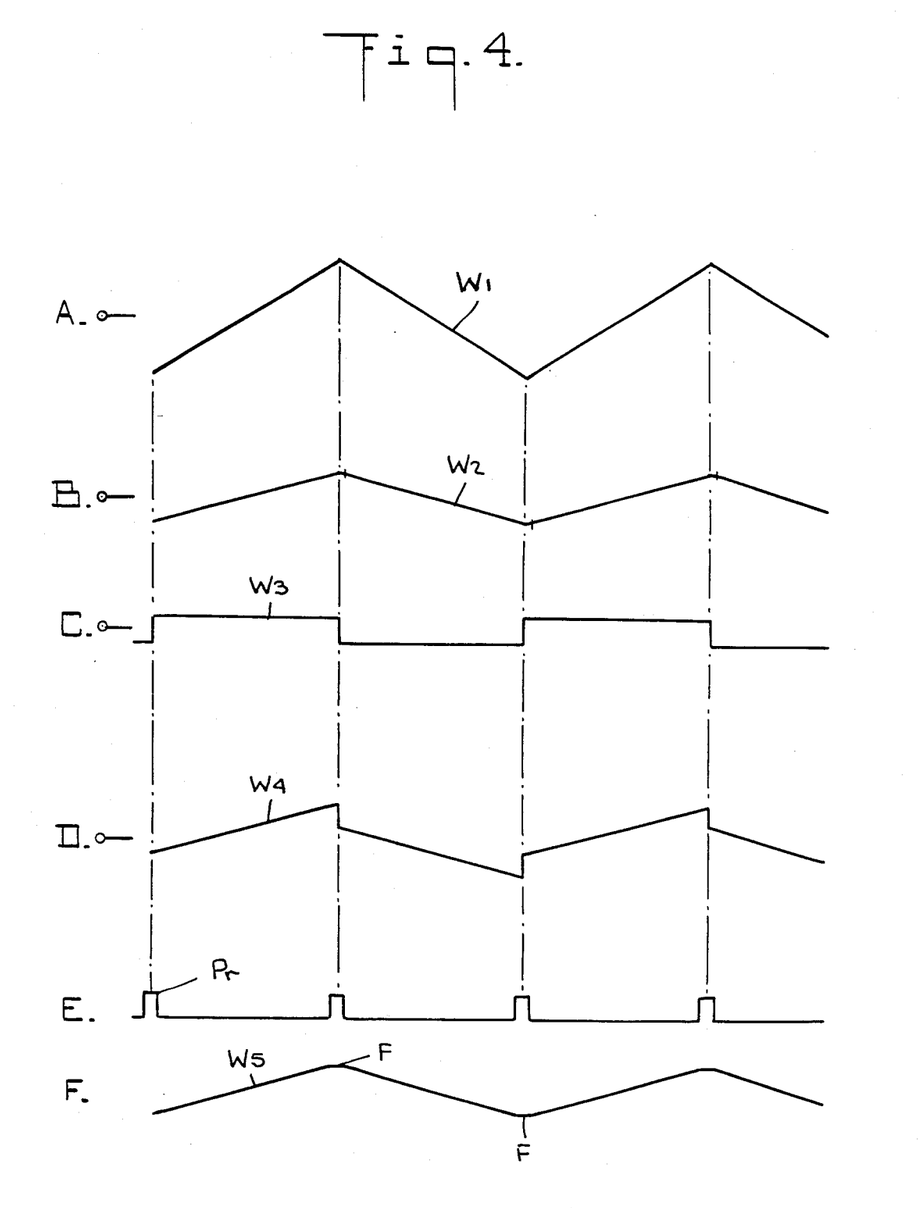
FIG. 4 is a timing diagram whose waveforms A to F are related to the operation of a second embodiment of the invention.

Referring now to FIG. 4, there is shown the timing diagram for another converter arrangement to eliminate the pick-up voltage component with only pure flow information remaining in the output of the converter. The converter arrangement is essentially the same as in FIG. 1, except for the manner in which the composite signal is processed.

Form A in FIG. 4 shows the waveform $W_1$ of the flux wave; Form B in FIG. 4 shows the waveform $W_2$ of the resultant flow signal which is a replica of the flux wave; Form C in FIG. 4 shows the waveform $W_3$ of the pick-up loop voltage where $d\phi/dt=K$; and Form D in FIG. 4 shows the composite signal $W_4$ combining the signal and pickup voltage components.

Form E in FIG. 4 shows reset pulses $P_r$, which are so applied to amplifier 26 in the converter as to restore the flow signal during each flux transition (reversal of direction) to its final value just prior to the flux changing direction. As a consequence, the resultant signal $W_5$, as shown in form F in FIG. 4, is the triangular waveform of the electrode signal, but with the pick-up voltage component omitted, the peaks of the triangles being flattened at F because of the blanking out effect of pulses $P_r$. The output, therefore, contains only flow rate information.

Referring now to FIG. 5, where is shown the timing diagram for still another converter arrangement to eliminate the pick-up component simply by integrating the composite signal. Form A in FIG. 5 shows the triangular waveform $W_x$ of the flow signal. The rectangular waveform $W_y$ in form B in FIG. 5 is the spurious pick-up loop voltage, as before. Waveform $W_e$ in form C in FIG. 5 is the composite signal combining the flow signal and pick-up loop voltage components.

By integrating the composite signal shown in form C in FIG. 5 from one flux zero crossing ($t_0$) to the next flux zero crossing ($t_1$), the integral of the pick-up voltage during this time interval will be zero, whereas the integral of the flow portion of the signal will be proportional to flow rate, thereby eliminating the spurious component from the output.

Thus, in the FIG. 5 arrangement, the measurement interval commences at a flux zero crossing and continues to the next flux zero crossing. The transient from positive slope to negative slope and vice versa is thereby included in the flow measurement. This in turn eliminates the need to reset or rezero the electronics at the time of waveform transition.

The present invention has been described as being particularly advantageous in regard to noise problems when using a triangular wave drive whose frequency is at least 30 Hz, which is one half that of a standard 60 Hz power line frequency. In practice, however, an improved flowmeter operation may be obtained at other drive frequencies. Thus, an efficient magnetic flowmeter operation is also obtainable when using a magnetic field triangular flux wave whose frequency is at the fundamental of the line frequency or is any suitable sub-harmonic or harmonic thereof. Hence, a flowmeter according to the invention is a general purpose instrument.

And while the invention has been described in connection with metering electrodes that are in direct physical contact with the fluid being metered, use may also be made of electrodes that are capacitively coupled to the fluid, as in the magnetic flowmeter disclosed in the above-identified McHale et al. patent.

In the present invention, it is essential that the flow signal yielded by the metering electrodes be applied to an input amplifier (see amplifier 11 in FIG. 1) having a high input impedance. Since the flux waveform is triangular, the flow signal amplified by the high-impedance signal amplifier retains its triangular form regardless of whether the signal applied to the amplifier input is derived from electrodes which are in direct contact with the fluid or are capacitively coupled thereto. On the other hand, any pickup voltage (quadrature or spurious) assumes a square waveform by virtue of the $d\phi/dt=k$ (constant) relationship, as previously explained.

In the McHale et al. magnetic flowmeter, as noted in the Abstract of this patent, the meter is of "the capacitively-coupled type" and "includes low-input impedance detection circuitry which responds to a flow-induced current signal that is related to the voltage induced at the electrodes." In the McHale et al. arrangement, the flow signal is a derivative of a linear ramp current flowing into a low-impedance current amplifier through the coupling capacitor. This results in $di/dt=k$ (constant), and the flow signal is therefore a square wave.

In contradistinction to McHale, in the present invention, the electrode signal has a triangular wave component that corresponds to the triangular flux wave and a rectangular wave component that is a function of the derivative of the magnetic flux in respect to time and because of the triangular flux wave is equal to a constant. In the present invention, the electrode signal is applied to a converter having a high input impedance which includes means to eliminate the rectangular wave component whereby the signal output of the converter is proportional to flow rate and is free of the spurious components.

In order to produce a magnetic field whose flux assumes a triangular waveform, we have disclosed an arrangement in FIG. 1 wherein a pick-up coil 17 is used to sense the shape of the magnetic flux. Alternatively, the magnetic flux shape can be inferred from the magnetic current which should also assume a triangular waveform. This could be effected by sensing the voltage across a resistor in series with the magnet coils. The set point for the magnet driver would then have to be a triangular wave. Or the voltage derived from the current flowing through this resistor could be differentiated to become a square wave, in which case the set point would then need to be a square wave.

While there have been shown and described preferred embodiments of an electromagnetic flowmeter with triangular flux drive in accordance with the invention, it will be appreciated that many changes and modifications may be made therein without, however, departing from the essential spirit thereof.

We claim:

1. An electromagnetic flowmeter provided with a flow tube having a pair of electrodes mounted thereon at opposed positions and an electromagnet to establish a transverse magnetic flux field in the tube, whereby when the flux field is intersected by the flowing fluid, a voltage is induced therein which is transferred to the electrodes to produce a flow signal, said flowmeter comprising:

A means to so drive said electromagnet as to produce a flux field having a triangular waveform the flow signal yielded at the electrodes is a composite wave having a triangular wave component that is a function of the triangular flux wave and the flow and a rectangular wave component that is a function of the derivative of the magnetic flux in respect to time which by reason of the triangular flux wave is a constant independent of flow; and B a converter responsive to said flow signal and including means to cancel said rectangular wave component whereby the signal output of said converter is proportional to the flow rate of the fluid, said means to cancel including means in said converter to force the composite wave to zero immediately following flux reversal.

2. A flowmeter as set forth in claim 1, wherein said electrodes are in contact with the fluid passing through the flow tube.

3. A flowmeter as set forth in claim 1, wherein said electrodes are capacitively coupled to said fluid passing through the tube.

4. A flowmeter as set forth in claim 1, wherein said converter includes an input amplifier having a high input impedance.

5. A flowmeter as set forth in claim 1, further including a flux sensing coil associated with said flow tube to provide a square wave, a gating logic yielding a square wave set point, and means to apply said square wave from the coil and the square wave set point from said logic to a flux magnet driver to provide a voltage for driving said electromagnet.

6. A flowmeter as set forth in claim 1, wherein said converter includes a signal amplifier whose input is coupled to said electrodes to receive said composite wave, a reset amplifier whose input is provided with a storage capacitor and is connected through a first electronic switch to the output of the signal amplifier and whose output is connected to the input of the signal amplifier through a second electronic switch, said logic providing gating pulses to said first and second switches to close said first switch to charge said capacitor with the output from the signal amplifier and to thereafter close said second switch to couple said capacitor to the input of the signal amplifier.

7. A flowmeter as set forth in claim 1, further including a pair of synchronous demodulators coupled in phase opposition to the output of said signal amplifier.

8. A flowmeter as set forth in claim 7, wherein said demodulators are constituted by electronic gates operated in phase opposition by gating signals supplied thereto by said logic.

* * * * *

UNITED STATES PATENT OFFICE
CERTIFICATE OF CORRECTION

Patent No. 4,704,907                    Dated Nov. 10, 1987

Inventor(s) Elmer D. Mannherz et al.

It is certified that error appears in the above-identified patent and that said Letters Patent are hereby corrected as shown below:

Column 9, line 22, after "waveform" insert --whereby--

Signed and Sealed this

Twenty-sixth Day of July, 1988

Attest:

DONALD J. QUIGG

*Attesting Officer*    Commissioner of Patents and Trademarks